US012773892B2

(12) United States Patent
Bach

(10) Patent No.: US 12,773,892 B2
(45) Date of Patent: Oct. 27, 2026

(54) WINDSHIELD MOUNTING ASSEMBLY

(71) Applicant: Pacific Coast Marine Windshields Ltd., Delta (CA)

(72) Inventor: Darren Bach, Delta (CA)

(73) Assignee: PACIFIC COAST MARINE WINDSHIELDS LTD., Delta (CA)

( * ) Notice: Subject to any disclaimer, the term of this patent is extended or adjusted under 35 U.S.C. 154(b) by 528 days.

(21) Appl. No.: 18/365,472

(22) Filed: Aug. 4, 2023

(65) Prior Publication Data

US 2024/0042834 A1 Feb. 8, 2024

Related U.S. Application Data

(60) Provisional application No. 63/370,417, filed on Aug. 4, 2022.

(51) Int. Cl.
*B63B 17/00* (2006.01)
*B60J 1/06* (2006.01)

(52) U.S. Cl.
CPC ................. *B60J 1/06* (2013.01); *B63B 17/00* (2013.01)

(58) Field of Classification Search
CPC ...... B60J 1/06; B60J 1/006; B60J 1/04; B63B 17/00
USPC .......................................................... 114/361
See application file for complete search history.

(56) References Cited

U.S. PATENT DOCUMENTS 1,170,880 A * 2/1916 Crouch ....................... B60J 1/04 49/374
1,536,626 A * 5/1925 Potter ......................... B60J 1/04 16/390
1,699,285 A * 1/1929 Fill ............................ B60J 1/04 296/93
1,858,880 A * 5/1932 Carlson ....................... B60J 1/04 16/250
1,860,198 A * 5/1932 Moore ......................... B60J 1/04 16/377
1,921,261 A * 8/1933 Potter ......................... B60J 1/04 16/355
1,966,993 A * 7/1934 Myers ......................... B60J 1/04 296/96.2
2,034,759 A * 3/1936 Hughes ....................... B60J 1/04 49/248
2,087,495 A * 7/1937 Anderson .................. B60J 1/04 296/93
2,089,282 A * 8/1937 Macauley .................. B60J 1/04 296/96.2
2,319,869 A * 5/1943 Kramer ....................... B60J 1/04 296/96.2
3,093,844 A * 6/1963 Brock ...................... B63B 19/02 114/364
3,093,845 A * 6/1963 Brock ...................... B63B 17/02 114/361

(Continued)

FOREIGN PATENT DOCUMENTS

FR 2632348 A1 * 12/1989 ............... E06B 3/62

*Primary Examiner* — Hilary L Gutman
(74) *Attorney, Agent, or Firm* — Kyle Straughan; Holland & Knight LLP

(57) ABSTRACT

This invention provides systems, devices, and methods for the assembly of a windshield mounting assembly that foregoes many traditional fastening mechanisms in favor of the combination of a windshield, joiner extrusion, bonding agent, and a mounting extrusion.

14 Claims, 5 Drawing Sheets

(56) References Cited

U.S. PATENT DOCUMENTS 3,123,839 A * 3/1964 Reid .......... B60J 1/04 292/276
3,134,112 A * 5/1964 Hage .......... B60J 1/04 114/361
3,172,419 A * 3/1965 Lewis .......... B63B 17/02 114/361
3,304,657 A * 2/1967 Singleton .......... B63B 19/02 114/361
3,654,648 A * 4/1972 Wilhoit .......... B63B 19/02 114/364
3,806,188 A * 4/1974 Tantlinger .......... B60J 10/00 49/495.1
3,810,267 A * 5/1974 Fussell, Jr. .......... B63B 19/02 114/364
3,978,535 A * 9/1976 Swan .......... B63B 19/02 114/364
4,151,620 A * 5/1979 Heuzonter .......... B63B 17/00 114/361
4,750,449 A * 6/1988 Muhlberger .......... B60J 10/70 114/361
4,823,511 A * 4/1989 Herliczek .......... B60J 10/74 49/404
4,993,351 A * 2/1991 Zirkelbach .......... B63B 19/04 114/361
D324,368 S * 3/1992 Zirkelbach .......... D25/119
5,189,980 A * 3/1993 Zirkelbach .......... B63B 19/04 114/361
5,203,277 A * 4/1993 Norman .......... B63B 19/02 114/361
D337,094 S * 7/1993 Bernstein .......... D25/119
5,269,250 A * 12/1993 Daniels .......... B63B 19/02 114/361
5,601,050 A * 2/1997 Erskine .......... B63B 29/02 114/361
5,664,519 A * 9/1997 Erskine .......... B63B 19/02 114/361
5,784,982 A * 7/1998 Erskine .......... B63B 29/00 114/361
6,253,702 B1 * 7/2001 Schoeller, Jr. .......... B62D 35/00 296/180.1
7,434,533 B2 * 10/2008 Erskine .......... B63B 17/00 114/361
7,845,304 B2 * 12/2010 Daniels .......... B63B 17/02 114/361
D635,166 S * 3/2011 Malmberg .......... D15/147
8,166,725 B2 * 5/2012 Griffith .......... B63B 17/00 296/96.13
10,597,120 B2 * 3/2020 Oakes .......... F16B 5/0685
2002/0174820 A1 * 11/2002 Shearer .......... B63B 17/02 114/361
2005/0183652 A1 * 8/2005 Whited, II .......... B63B 17/02 114/361
2007/0074648 A1 * 4/2007 Daniels .......... B63B 17/02 114/361
2007/0215031 A1 * 9/2007 Bach .......... B63B 17/02 114/361
2008/0098948 A1 * 5/2008 Shearer .......... B63B 19/02 114/361
2010/0058707 A1 * 3/2010 Griffith .......... B63B 17/00 52/716.6
2012/0180293 A1 * 7/2012 Griffith .......... B63B 17/00 29/428
2018/0009509 A1 * 1/2018 Forbes .......... F16J 15/025

* cited by examiner

WINDSHIELD MOUNTING ASSEMBLY

FIELD OF THE INVENTION

This invention relates generally to systems, devices, and methods for the assembly and attachment of windshields for marine watercraft, and more specifically to a marine windshield mounting assembly utilizing extruded joiner sections attached to a solid windshield plate coupled thereto by a bonding agent.

BACKGROUND OF THE INVENTION

A continuous challenge in the field of vehicle windshield design is the implementation of user visibility measures that meet a number of demanding factors in the marketplace, including, but not limited to, ensuring customizability sufficient to meet the needs of a wide range of customers, ensuring modularity and variability in the visibility measures to ensure they can be adjusted to meet the needs of the situation, and ensuring the safety of and visual clarity for the user of the vehicle. In the case of, for example, marine vessel windshields, frequently the user may need to adjust the specific positioning of such windshield in order to protect from insects, water, wind, debris, or other potential hazards, while also ensuring that the windshield is rigidly attached to the body of the vessel and not going to potentially become a hazard itself due to unwanted alteration of its position resulting from jostling of the vessel, buffeting from air flow, or other factors that may otherwise interfere with the proper positioning of the windshield.

In addition, the field demands certain other factors be met, such as the minimization of drag, simplified construction, renewable materials, and other marketplace demands that the present invention is able to, at least in part, resolve. The prior art in the field is often inadequate in at least some of these areas, and the present invention resolves many of these deficiencies by reducing the potential for failure and the likelihood of the glass being cracked or shattered during the manufacturing process. Similarly, this invention can work with a variety of marine windshield shapes and is not limited solely to substantially flat pieces of glass.

As a result, a key objective of the present invention is to provide improved windshield mounting assemblies, and methods of forming the same that are well suited for use with curved boat windshields on top, bottom and side edges. In addition, the present invention provides an improved windshield mounting assembly that presents increased durability and aesthetic flexibility without compromising either. Similarly, the present invention provides a more cost-efficient approach to windshield mounting as it reduces the likelihood of failure that can result during the manufacturing process, the cost of materials to prepare the assembly, and the cost of having multiple different machines to produce different mounting areas. The present assembly is modular such that substantially the same pieces can function on a variety of windshield shapes without alteration thus removing the need for a multitude of extrusion varieties, bonding agents, or other components.

An additional benefit of the present invention is that the combination of the joiner extrusion and mounting extrusion ensures that the windshield will remain firmly in place, but with the joiner extrusion being, in some embodiments, capable of rotating within the mounting extrusion, the windshield can be adjusted based on the needs of a user at any given moment, such as to deflect wind or water.

BRIEF SUMMARY

The present invention is designed to provide a reliable, durable mounting assembly for a windshield that can be utilized in a variety of situations and on a variety of vehicles, where the mounting assembly is comprised of a relatively, small number of components without loss of effectiveness. Specifically, the present invention comprises, in many embodiments, a windshield, joiner extrusion, mounting extrusion, and a bonding agent to hold the individual components together. The windshield may be of a variety of shapes, depending on the shapes preferred for the situation in which it is being utilized. The joiner extrusion similarly may take on a variety of shapes and may be instead split into multiple joiner extrusions if preferred. The joiner extrusion would be further comprised of a channel to accommodate the edge of the windshield, and in some embodiments the channel is further comprised of a series of ridges, lips, or similar protrusions designed to make contact with the windshield. These components would allow the bonding agent to create a stronger bond between the windshield and the joiner extrusion. The mounting extrusion, in some embodiments, is comprised of a channel configured to be substantially similar to that of the joiner extrusion except larger such that the joiner extrusion can be accommodated therein; some embodiments of the invention will have the channel of the mounting extrusion be precisely or substantially the same diameter as the width of the joiner extrusion to form a tight fit while still permitting the joiner extrusion to rotate within the channel along the long axis. The mounting extrusion may be a variety of shapes, with many embodiments configuring it with one or more protrusions extending out from the channel and featuring internal flanges, lips, ridges, or other additional protrusions to allow it to be affixed to a vehicle or other use. The bonding agent, depending on the needs of the embodiment, can be a variety of different bonding capable agents such as cyanoacrylates, epoxies, or resins.

BRIEF DESCRIPTION OF THE DRAWINGS

Embodiments of the present invention are described in detail below with reference to the following drawings.

DETAILED DESCRIPTION

The present invention, in some embodiments, is comprised of: a joiner extrusion typically, but not necessarily or exclusively, made of one or more lengths of rigid plastic in a substantially cylindrical form with a channel running along its longitudinal axis; a mounting extrusion with at least one channel substantially similar in shape to the outer surface of the joiner extrusion and configured to couple to the joiner extrusion by inserting the joiner extrusion into the channel of the mounting extrusion wherein the mounting extrusion is configured to couple to an assembly; a windshield configured such that at least one edge of the windshield is substantially the same shape as the channel of the joiner extrusion and can be inserted into the channel of the joiner extrusion; and a bonding agent configured to bond to the windshield and the channel of the joiner extrusion.

Figures 1, 1A:
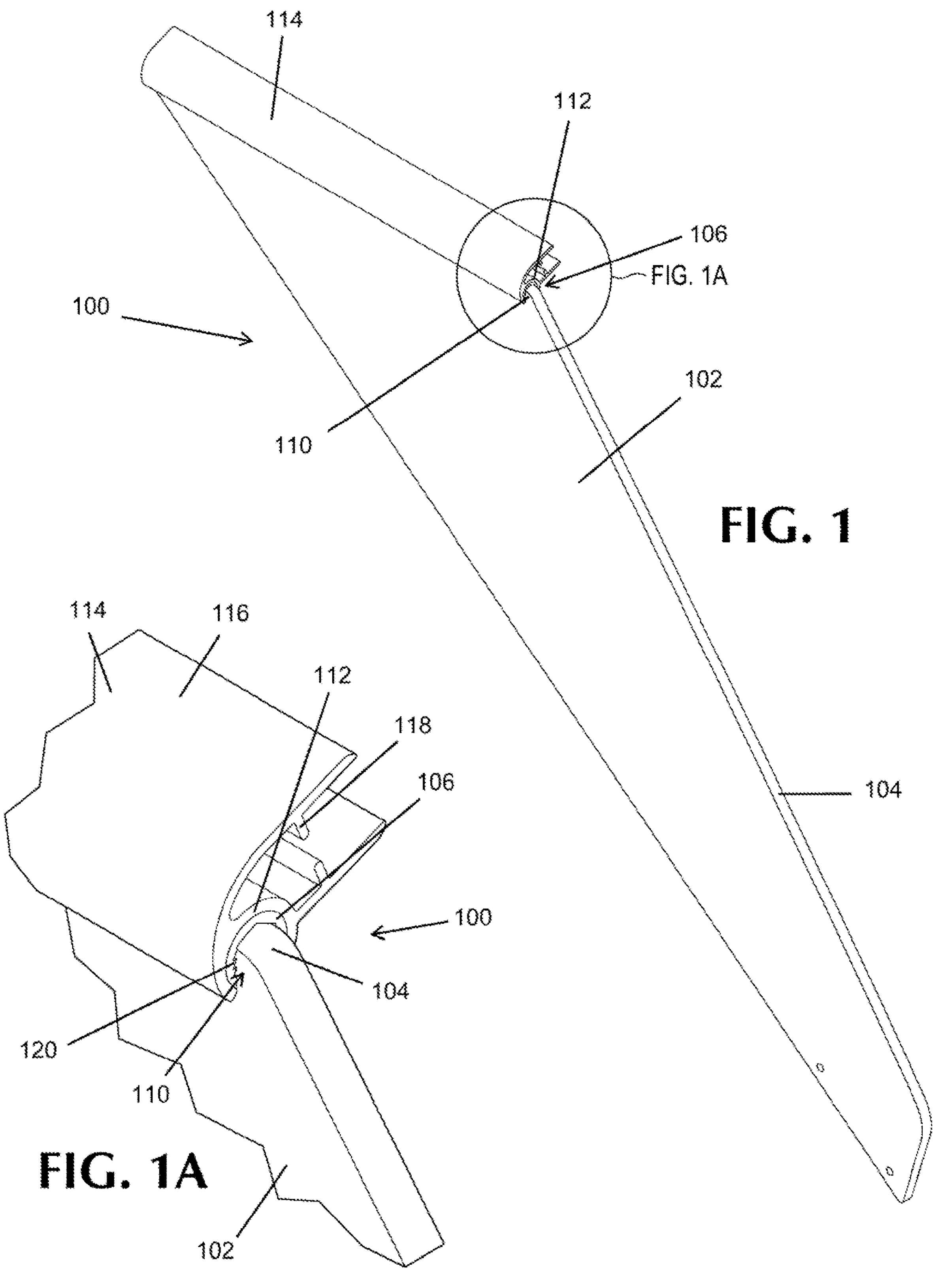
FIG. 1 depicts a perspective view of a windshield mounting assembly in accordance with an embodiment of the invention.
FIG. 1A depicts a magnified perspective view of a windshield mounting assembly in accordance with an embodiment of the invention

FIG. 1 depicts a perspective view of a windshield mounting assembly 100 in accordance with an embodiment of the invention. In some embodiments, a windshield mounting assembly 100, the assembly comprises, a windshield 102 comprised of at least one edge 104, one or more joiner extrusions 106 wherein the joiner extrusions 106 are comprised of a length of material with a channel 110 running along a longitudinal axis of the length of material where such channel is shaped to accommodate the at least one edge 104 of the windshield 102; and a bonding agent configured to adhere to both the windshield 102 and the one or more joiner extrusions 106.

FIG. 1 further demonstrates how the assembled invention may be put together, with the windshield placed into the accommodating channel 110 of the joiner extrusion 106 which is then inserted into a mounting channel 112 of the mounting extrusion 114. The joiner extrusion 106 and windshield 102 are then coupled through the use of a bonding agent, which in some embodiments of the invention is injected, where such injection may take place at the end of the channel 110 along its longitudinal axis, or some bonding agent may be applied to the channel 110 and/or windshield 102 at the time the windshield 102 is inserted therein. As can be seen in FIG. 1, it is not required that the joiner extrusion 106 and mounting extrusions 114 be bonded with the bonding agent, but they can be depending on the needs of the particular embodiment in which they are implemented. For example, in some embodiments, it may be preferable for the joiner extrusion 106 to be able to rotate within the mounting extrusion 114 without the ability to leave the mounting channel 112, thus permitting a user to adjust the position of the windshield 102.

In some embodiments, the invention is comprised of: a joiner extrusion 106 typically, but not necessarily or exclusively, made of one or more lengths of rigid plastic in a substantially cylindrical form with a channel 110 running along its longitudinal axis; a mounting extrusion 114 with at least one mounting channel 112 substantially similar in shape to the outer surface of the joiner extrusion 106 and configured to couple to the joiner extrusion 106 by inserting the joiner extrusion 106 into the mounting channel 112 of the mounting extrusion 114 wherein the mounting extrusion 114 is configured to couple to an assembly; a windshield 102 configured such that at least one edge 104 of the windshield 102 is substantially the same shape as the channel 110 of the joiner extrusion 106 and can be inserted into the channel 110 of the joiner extrusion 106; and a bonding agent configured to bond to the windshield 102 and the channel 110 of the joiner extrusion 106.

According to some embodiments, the windshield 102 component may be comprised of a variety of types of glass depending on the needs of the embodiment; whether implemented on a structure, vehicle, or other item. For example, some manufacturers may prefer a shatter resistant or "safety" glass, while others may prefer an ordinary glass or glass alternative such as polymer. In such cases, or in the case of other varieties, the exact composition of the windshield 102 is not fundamental to the function of the invention. In addition, while the component is referred to as a windshield 102, and in many embodiments is comprised of glass as described herein, in some embodiments, the plate of glass that comprises the windshield 102 may instead be replaced with an alternative substance such as a polymer or plastic, a composite of several substances, hybrid thereof, or could incorporate a combination of two or more of the foregoing. The windshield 102 component can also come in a variety of shapes and textures, depending on the needs of the specific embodiment. In other embodiments, the windshield 102 component may instead be an opaque or only partially translucent panel or similar component wherein visibility through such windshield 102 is not desired or necessary to such embodiment.

FIG. 1A depicts a magnified perspective view of a windshield mounting assembly 100 in accordance with an embodiment of the invention. Similar to that depicted in FIG. it can be clearly seen in FIG. 1A the way the components can be assembled, with the windshield 102 inserted into the channel 110 of the joiner extrusion 106 and the joiner extrusion 106 then inserted into a mounting channel 112 of the mounting extrusion 114. In the embodiment depicted, the mounting extrusion 114 then has two flanges 116 extending substantially away from the mounting channel 112, with an additional protrusion 118 on each with the two additional protrusions 118 pointing inward towards each other, with the flanges 116 being configured to attach the assembly to a vehicle, structure, or other item in need of the windshield 102. In FIG. 1A the ridges 120 inside the channel 110 of the joiner extrusion 106 in this embodiment are visible and in contact with the windshield 102; the ridges 120 make physical contact with the windshield 102 in this embodiment and the bonding agent can fill the space between them and the joiner extrusion 106, as well as the remaining space between the interior of the channel 110 and the edge of the windshield 102 inserted therein. In other embodiments, these ridges 120 may be absent and the bonding agent may fill the space between the windshield 102 and channel 110, if the particular configuration of the channel 110 requires or allows for any.

In some embodiments, the invention is comprised of: a joiner extrusion 106 typically, but not necessarily or exclusively, made of one or more lengths of rigid plastic in a substantially cylindrical form with a channel 110 running along its longitudinal axis; a mounting extrusion 114 with at least one mounting channel 112 substantially similar in shape to the outer surface of the joiner extrusion 106 and configured to couple to the joiner extrusion 106 by inserting the joiner extrusion 106 into the mounting channel 112 of the mounting extrusion 114 wherein the mounting extrusion 114 is configured to couple to an assembly; a windshield 102 configured such that at least one edge 104 of the windshield 102 is substantially the same shape as the channel 110 of the joiner extrusion 106 and can be inserted into the channel 110 of the joiner extrusion 106; and a bonding agent configured to bond to the windshield 102 and the channel 110 of the joiner extrusion 106.

Figure 2:
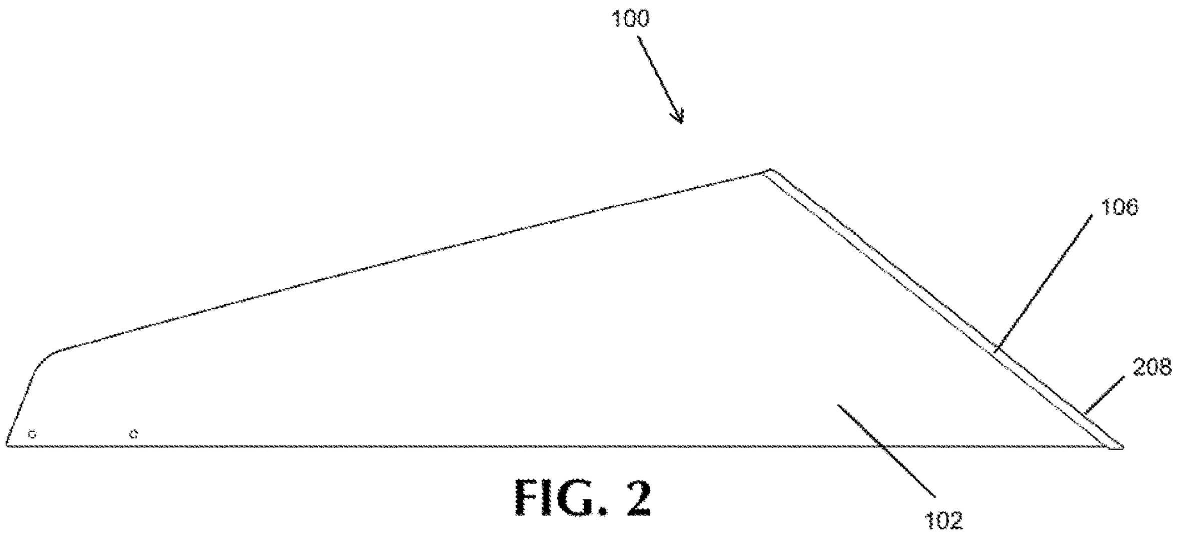
FIG. 2 depicts a side view of a windshield mounting assembly in accordance with an embodiment of the invention.

FIG. 2 depicts a side view of a windshield mounting assembly 100 in accordance with an embodiment of the invention. Similar to that of FIG. 1, FIG. 2 depicts a side view of the windshield mounting assembly 100 with the components assembled except for the mounting extrusion. In FIG. 2 is depicted an embodiment wherein the windshield 102 has been inserted into the channel 110 of a joiner extrusion 106 wherein the joiner extrusion 106 in this embodiment is of substantially equal length to that of the edge of the windshield 102. In FIG. 2 is demonstrated the length of material 208 that makes up the body of the one or more joiner extrusions 106.

Figure 3:
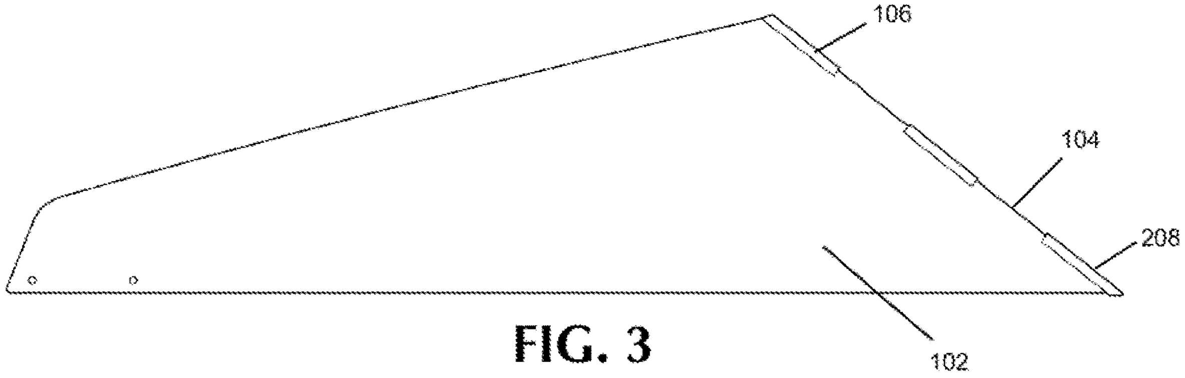
FIG. 3 depicts a side view of a windshield mounting, assembly in accordance with an embodiment of the invention.

FIG. 3 depicts a side view of a windshield mounting assembly 100 in accordance with an embodiment of the invention. Similar to that of FIG. 2, FIG. 3 depicts a side view of the windshield mounting assembly 100 with the components assembled except for the mounting extrusion. In FIG. 3 is depicted an embodiment wherein the assembly 100 is comprised of multiple joiner extrusions 106, in this embodiment there are three, wherein each is approximately ⅕th the length of the edge 104 of the windshield 102 and they have been placed at each end and in the middle. Other embodiments involving multiple joiner extrusions 106 may utilize more or fewer than three, may position them at different locations along the edge 104 of the windshield 102, and/or may be of different lengths from each other. Embodiments such as FIG. 3 may be useful in situations where the mounting extrusion also has to be split into multiple pieces, where the specific windshield 102 design makes a single joiner extrusion unfeasible, or to achieve an aesthetic effect desired for the embodiment. In some embodiments, as demonstrated in FIG. 3, some portion of the edge 104 of the windshield 102 may be left exposed.

For some examples of the invention, there may be multiple joiner extrusions 106 and/or mounting extrusions along the length of windshield 102; may be comprised of multiple windshields 102 each comprised of one or more joiner extrusions 106 and/or mounting extrusions. For example, some embodiments may involve a tiered assembly in which there are two or more corner mounting extrusions, each containing one or more joiner extrusions 106 in their respective mounting channels, and each of the joiner extrusions 106 may be coupled to one or more windshields 102.

Figure 4:
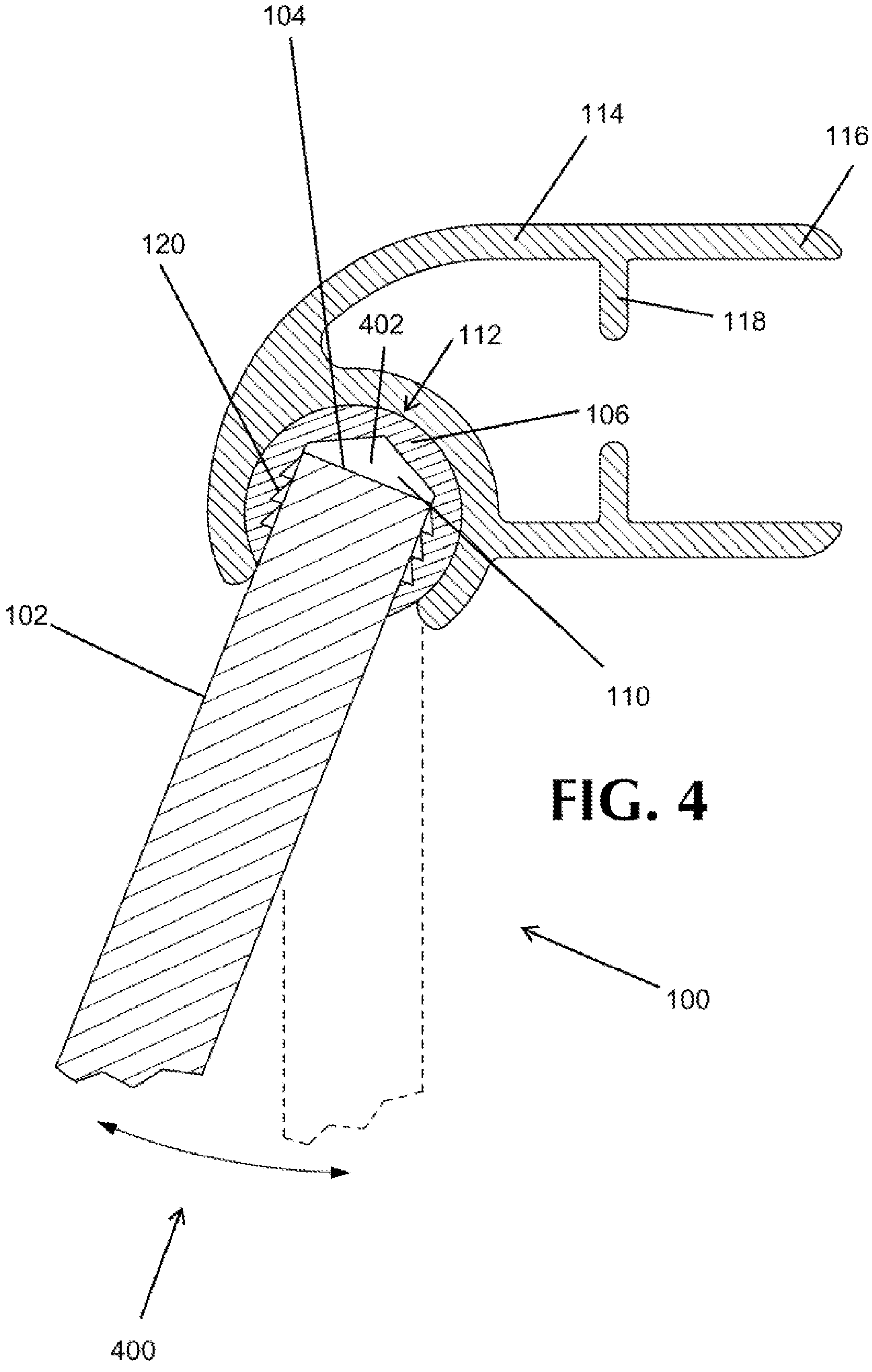
FIG. 4 depicts a top view of a windshield mounting, assembly in accordance with an embodiment of the invention.

FIG. 4 depicts a top view of a windshield mounting assembly 100 in accordance with an embodiment of the invention. For ease of identifying the components, shading has been added to differentiate them. FIG. 4 illustrates a view of an embodiment of the windshield mounting assembly 100 looking down its longest axis to demonstrate the connections between the windshield 102, the joiner extrusion 106, and the mounting extrusion 114, while also demonstrating the articulation 400 possible for the windshield 102 in some embodiments wherein the joiner extrusion 106 rotates within the mounting extrusion 114 in order to rotate the windshield 102. In such figure we can clearly see the mounting channel 112 created by the mounting extrusion 114 and the channel 110 of the joiner extrusion 106, wherein the windshield 102 has been inserted into the channel 110 of the joiner extrusion 106 and the joiner extrusion 106 is in turn inserted into the mounting channel 112 of the mounting extrusion 114. Also demonstrated in FIG. 4 are the flanges 11 and protrusions 118 of the mounting extrusion 114, as well as a variant of the ridges 120 of the joiner extrusion 106 in channel 110.

In some embodiments the channel 110 of the joiner extrusion 106 and/or mounting extrusion 114 may have smooth walls, while in other embodiments the walls may have ridges 120, flanges, textures, projections, or other features along the length. These features may perform a variety of functions, including, but not limited to, providing additional purchase for an inserted windshield 102 to attach to or providing additional complexity to form a strong bond with a bonding agent. For example, some embodiments may have one or more projections extending into the channel 110 and running, the length of the channel 110 that is substantially triangular in shape when viewed down the longitudinal axis of the invention where their triangular shape points at least partially away from the mouth of the channel 110 to form a ridge 120. Such projections may provide additional friction and/or pressure to hold the windshield 102 component of the windshield 102 in the extrusion and/or may provide additional surface area for a bonding agent to attach.

The mounting extrusion(s) 114 may be configured to couple to a variety of bases, such as, but not limited to, a vessel, vessel windshield, or other assembly. In some embodiments, this assembly may be the pillar of a vehicle's windshield 102, while in others it may be another vehicle body component or apparatus. In some embodiments, the mounting extrusion(s) 114 may couple through the use of a mounting channel 112 along its longitudinal axis, with the mounting channel 112 capable of possessing the same traits as the first, including, but not limited to, features within the channel 110 or its shape. Some examples of the invention may involve a mounting extrusion 114 in which the mounting channels 112 are connected by an aperture, or they may be a single mounting channel 112 that separates the mounting extrusion 114 into two pieces, with the mounting extrusion 114 connected along part of the length of the mounting channel 112 or at the top and/or bottom of the mounting extrusion 114. Depending on the embodiments, the joiner extrusion 106 may be slid into the mounting channel 112 of the mounting extrusion 114 along its longitudinal axis, while in others the mounting extrusion 114 may be configured to separate to admit the joiner extrusion 106, or it may be flexible enough to be pulled apart to admit the joiner extrusion 106. Depending on the embodiment, such process may be one-way, with a flange, prong, catch, or other mechanism incorporated into the mounting extrusion 114 to prohibit the joiner extrusion 106 from leaving once inserted, and similarly the joiner extrusion 106 may, in some embodiments, have similar features in its channel 110 to prohibit the windshield 102 from being removed once inserted.

In some embodiments the interior face of the channel 110 of the joiner extrusion 106 is largely uniform and/or smooth, while in others it may have ridges, protrusions, textures, imperfections, or other features shaped to increase the amount of contact with the bonding agent and/or windshield 102 or to otherwise increase the surface area of contact. In the case of ridges 120, the ridges 120 (or similar protrusions) may be configured to point unsaid towards the arc of the "U" shape if the channel 110 is viewed down its long axis, where the ridges 120 are, instead of pointing perpendicular to the plane of the windshield 102, are pointing at an angle somewhere between perpendicular and parallel. For example, in some embodiments the ridges 120 may point approximately 45 degrees relative to the plane of the windshield 102 in the direction that the windshield 102 was inserted from, which can increase the friction between the windshield 102 and ridges, thus reducing any likelihood that the windshield 102 is able to leave the channel 110; were it to be pulled on, the ridges 120 would be pulled inward and grip the windshield 102 more tightly. Similarly, in some embodiments the joiner extrusion 106 and/or mounting extrusion 114 may be extruded with a texture or imperfections which create additional surface area with which the bonding agent may bond; the windshield 102 may, in some embodiments, be textured, frosted, or otherwise textured or possess surface-area increasing features to facilitate such a bond.

Some embodiments of the invention may result in the edge 104 of the windshield 102 not contacting the back of the channel 110 of the joiner extrusion 106, leaving an inner cavity 402 that can be filled with bonding agent or left filled with air, depending on the needs of the embodiment.

The joiner extrusion 106 and mounting extrusion 114 may be comprised of a variety of materials such as polymers, metals, plastics, ceramics, composites, rubber, hybrid materials, glass, or silicates, combinations or hybrids of the foregoing or other materials, or yet-to-be developed materials, depending on the needs of the embodiment. In an example embodiment, the joiner extrusion 106 and mounting extrusion 114 may be comprised of a polymer that is substantially rigid, in which the joiner extrusion 106 is inserted into the mounting extrusion 114 and neither will significantly bend under forces experienced by such windshield 102.

In some embodiments, the invention is comprised of a joiner extrusion 106 typically, but not necessarily or exclusively, made or one or more lengths of rigid plastic in a substantially cylindrical form with a channel 110 running along its longitudinal axis; a mounting extrusion 114 with at least one mounting channel 112 substantially similar in shape to the outer surface of the joiner extrusion 106 and configured to couple to the joiner extrusion 106 by inserting the joiner extrusion 105 into the mounting channel 112 of the mounting extrusion 114 wherein the mounting extrusion 114 is configured to couple to an assembly; a windshield 102 configured such that at least one edge 104 of the windshield 102 is substantially the same shape as the channel 110 of the joiner extrusion 106 and can be inserted into the channel 110 of the joiner extrusion 106; and a bonding agent configured to bond to the windshield 102 and the channel 110 of the joiner extrusion 106.

Figure 5:
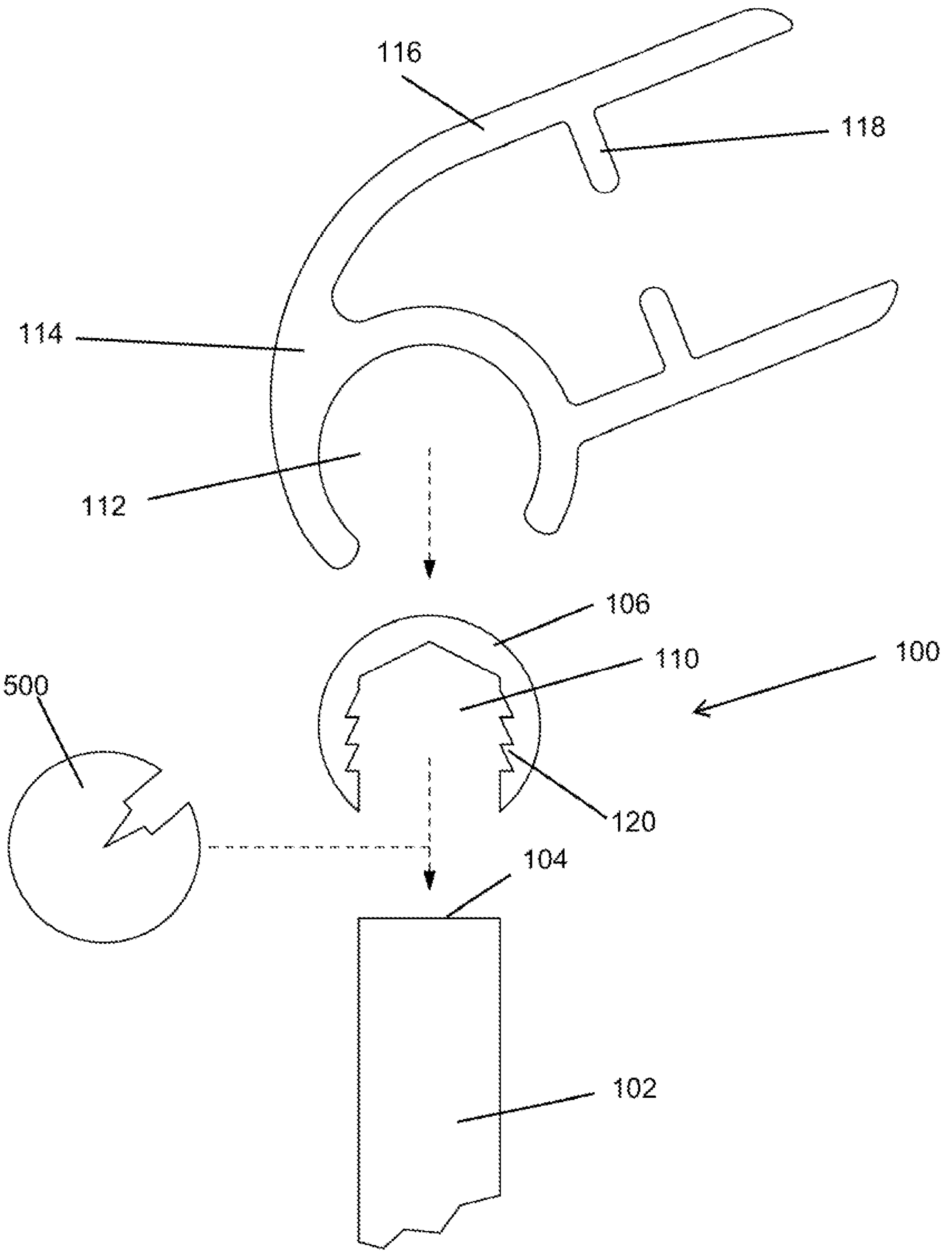
FIG. 5 depicts an exploded top view of a windshield mounting assembly in accordance with an embodiment of the invention.

FIG. 5 depicts an exploded top view of a windshield mounting assembly 100 in accordance with an embodiment of the invention. Similar to FIG. 4, FIG. 5 demonstrates a similar view of an embodiment with the components disassembled for ease of review of how each component interacts. As can be seen in the exploded view, the windshield 102 is inserted into the channel 110 of the joiner extrusion 106, which is in turn inserted into the mounting channel 112 of the mounting extrusion 114. A bonding agent 500 is applied to the windshield 102 at the time of insertion into the channel 110 of the joiner extrusion 106, or before such insertion, or after such insertion; the exact timing depends on the bonding agent 500 selected for the specific embodiment being used. In the present FIG. 5 the bonding agent 500 is symbolized using a universal symbol for the application of a bonding agent. The bonding agent 500 fills any gaps between the windshield 102 and the inner cavity 402 of the joiner extrusion 106, and some portions of the joiner extrusion 106, typically the ridges 120, will make direct contact with the windshield 102; leaving, in some embodiments, a number of gaps mixed with a number of areas of contact, such that the bonding agent 500 is in direct contact with both the windshield 102 and the joiner extrusion 106. In some embodiments the interior face of the channel 110 of the joiner extrusion 106 is largely uniform and/or smooth, while in others it may have ridges 120, protrusions, textures, imperfections, or other features shaped to increase the amount of contact with the bonding agent 500 and/or windshield 102 or to otherwise increase the surface area of contact. In the case of ridges 120, the ridges (or similar protrusions) may be configured to point inward towards the are of the "U" shape if the channel is viewed down its long axis as it is in FIG. 5, where the ridges 120 are, instead of pointing perpendicular to the plane of the windshield 102, are pointing at an angle somewhere between perpendicular and parallel. For example, in FIG. 5 the ridges 120 are pointing approximately 45 degrees relative to the plane of the windshield 102, which can increase the friction between the windshield 102 and ridges 120, thus reducing any likelihood that the windshield 102 is able to leave the channel 110; were it to be pulled on, the ridges 120 would be pulled inward and grip the windshield 102 more tightly.

The bonding agent may be a variety of adhesives depending on the needs of the embodiment. For example, some may rely on cyanoacrylates while others may use latex based. Other variants of the invention may utilize a bonding agent that is based on an epoxy or resin. The exact bonding agent used depends on the needs of the invention. In some embodiments the bonding agent may instead be one or more physical devices such as a screw or fastener that is pushed through an aperture inserted through the joiner extrusion 106 and/or mounting extrusion 114 and the windshield 102. For some embodiments, the bonding agent may be a type that can be dissolved or removed through application of a means such as a specific chemical agent, tool, or amount or force, in case the windshield 102 needs to be removed from the joiner extrusion channel 110 and replaced, or where the joiner extrusion 106 is removed from the mounting channel 112.

In some embodiments, the invention is comprised of: a joiner extrusion 106 typically, but not necessarily or exclusively, made of one or more lengths of rigid plastic in a substantially cylindrical form with a channel 110 running along its longitudinal axis; a mounting extrusion 114 with at least one mounting channel 112 substantially similar in shape to the outer surface of the joiner extrusion 106 and configured to couple to the joiner extrusion 106 by inserting the joiner extrusion 106 into the mounting channel 112 of the mounting extrusion 114 wherein the mounting extrusion 114 is configured to couple to an assembly; a windshield 102 configured such that at least one edge 104 of the windshield 102 is substantially the same shape as the channel 110 of the joiner extrusion 106 and can be inserted into the channel 110 of the joiner extrusion 106; and a bonding agent configured to bond to the windshield 102 and the channel 110 of the joiner extrusion 106.

Figure 6:
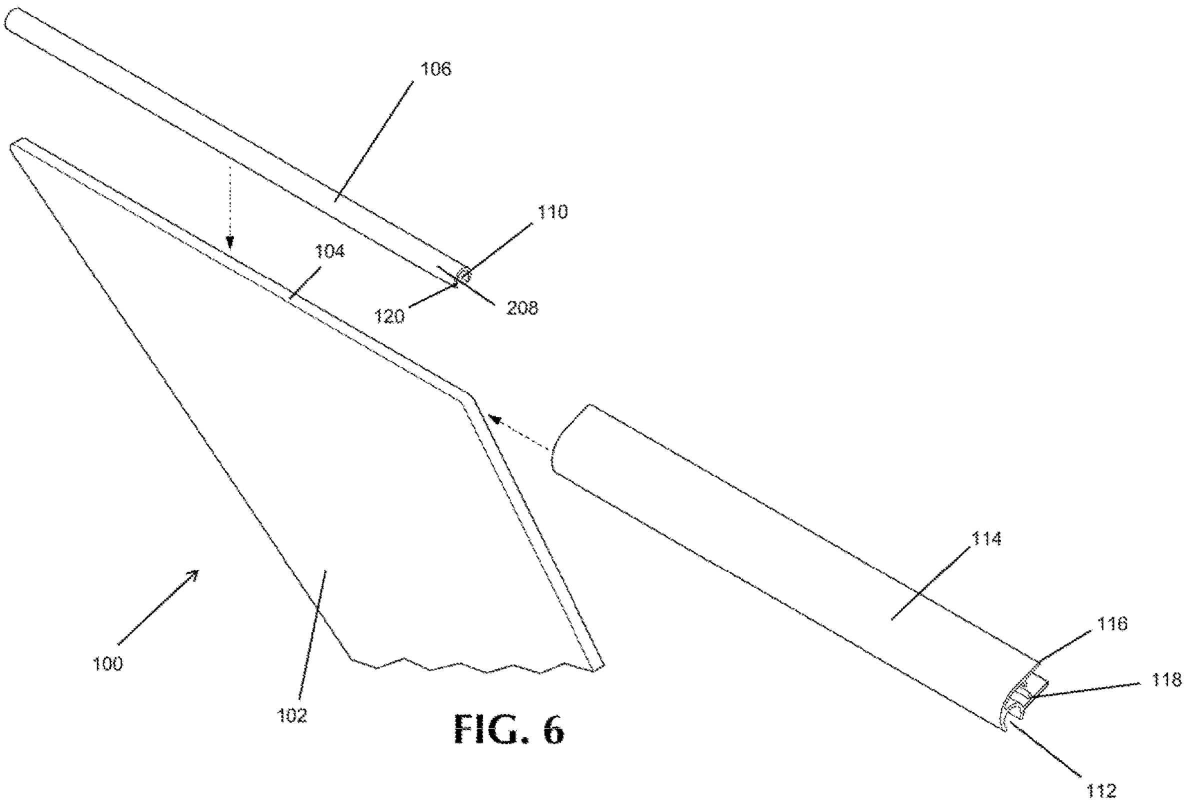
FIG. 6 depicts an exploded perspective view of a windshield mounting assembly in accordance with an embodiment of the invention.

FIG. 6 depicts an exploded perspective view of a windshield mounting assembly 100 in accordance with an embodiment of the invention. Turning to FIG. 6, this exploded view depicts the individual pieces and demonstrates how they are assembled; first the joiner extrusion 106 and windshield 102 are coupled via the channel 110, typically with a bonding agent applied anywhere from prior to up until after the parts are coupled, and then the joiner extrusion 106 is inserted into the mounting channel 112 of the mounting extrusion 114. In some embodiments the joiner extrusion 106 can be placed parallel to the windshield 102 and then pressed onto it, while in other embodiments it may be preferable to slide the joiner extrusion 106 down the length of the edge of the windshield 102 with the windshield sliding along the channel 110. Similarly, the mounting channel 112 of the mounting extrusion 114 may have the joiner extrusion 106 slid into it, or it may be pressed against the joiner extrusion 106 until the joiner extrusion 106 is forced inside the mounting channel 112. In other embodiments, a combination or variation of the foregoing methods may be exercised.

In some embodiments, the invention is comprised of: a joiner extrusion 106 typically, but not necessarily or exclusively, made of one or more lengths of rigid plastic in a substantially cylindrical form with a channel 110 running along its longitudinal axis; a mounting extrusion 114 with at least one mounting channel 112 substantially similar in shape to the outer surface of the joiner extrusion 106 and configured to couple to the joiner extrusion 106 by inserting the joiner extrusion 106 into the mounting channel 112 of the mounting extrusion 114 wherein the mounting extrusion 114 is configured to couple to an assembly; a windshield 102 configured such that at least one edge 104 of the windshield 102 is substantially the same shape as the channel 110 of the joiner extrusion 106 and can be inserted into the channel 110 of the joiner extrusion 106; and a bonding agent configured to bond to the windshield 102 and the channel 110 of the joiner extrusion 106.

The joiner extrusion 106 may be straight, have a curvature, a bend, an angle, or other features thereto, depending on the embodiment and shape of the windshield 102. Such shape may affect how it joins with the windshield, which may have a complementary shape, and the mounting extrusion 114 which similarly may have a complementary, or modified, shape.

In some embodiments the joiner extrusion 106 is coupled to the mounting extrusion 114 by inserting the joiner extrusion 106 into the mounting channel 112 of the mounting extrusion 114 longitudinally. The joiner extrusion 106, and by extension the windshield 102, can then be moved by applying pressure to the face or edges 104 of the windshield 102 and moving it in a clockwise or counterclockwise direction relative to the longitudinal axis of the joiner extrusion 106 and/or mounting channel 112 of the mounting extrusion 114. In some examples, this coupling allows the joiner extrusion 106 to rotate along its longitudinal axis in order to adjust the position of the windshield 102. The amount of mobility of the joiner extrusion 106 will depend on the opening width of the mounting channel 112 of the mounting extrusion 114, which may vary depending on the embodiment, wherein the manufacturer may take into consideration factors such as the possibility of the joiner extrusion 106 exiting the mounting extrusion 114, the curvature of the windshield 102, joiner extrusion 106, and/or mounting extrusion 114.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

The foregoing examples should be viewed as demonstrations of potential embodiments and are not exhaustive or necessarily conclusive as to the effectiveness of the present invention. In many situations, it may be preferable to utilize mixtures and conditions different from the above or use an embodiment of the invention which an example may have indicated was less effective but may be more optimal in such situation.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application. Many changes, modifications, variations and other uses and applications of the present construction will, however, become apparent to those skilled in the art after considering the specification and the accompanying figures. All such changes, modifications, variations and other uses and applications which do not depart from the spirit and scope of the invention are deemed to be covered by the invention which is limited only by the claims which follow.

It should be understood that while certain preferred forms, embodiments, and examples of this invention have been illustrated and described, the present invention is not to be limited to the specific forms or arrangement of parts described and shown, and that the various features described may be combined in other ways than those specifically described without departing from the scope of the present invention. The invention is intended to cover alternatives, modifications and equivalents, which may be included within the spirit and scope of the invention as defined by the appended claims.

What is claimed is:

1. A windshield mounting assembly, the assembly comprising, a windshield comprised of at least one edge, one or more joiner extrusions wherein the joiner extrusions are comprised of a length of material with a channel running along a longitudinal axis of the length of material where such channel is shaped to accommodate the at least one edge of the windshield;

a windshield mount extrusion wherein the windshield mount extrusion is comprised of a second length of material with a mounting channel running along a second longitudinal axis of the second length of material where such mounting channel is shaped to accommodate the one or more joiner extrusions and wherein the mounting channel is configured to at least partially enclose around the one or more joiner extrusions such that the one or more joiner extrusions can rotate without leaving the mounting channel; and a bonding agent configured to adhere to both the windshield and the one or more joiner extrusions.

2. The windshield mounting assembly of claim 1, wherein the channel of the one or more joiner extrusions is substantially cylindrical.

3. The windshield mounting assembly of claim 1, wherein there are at least two said jointer extrusions and each said joiner extrusion is coupled to the at least one edge of the windshield at different positions along a length of the at least one edge.

4. The windshield mounting assembly of claim 2, wherein the channel of the one or more joiner extrusions is further comprised of at least one set of parallel ridges positioned along an interior of the channel such that an apex of each ridge extends into an interior of the channel and points at least partially away from a mouth of the channel configured to accommodate the at least one edge of the windshield.

5. The windshield mounting assembly of claim 4, wherein the apexes of each ridge are configured to contact a face of the windshield when the windshield is inserted into the channel of the one or more joiner extrusions.

6. The windshield mounting assembly of claim 4, wherein the one or more joiner extrusions is comprised of at least two sets of parallel ridges.

7. The windshield mounting assembly of claim 5, wherein the channel of the joiner extrusion is further comprised of a bonding agent wherein the bonding agent fills a space between the parallel ridges of the joiner extrusion and the windshield.

8. The windshield mounting assembly of claim 7, wherein a space is created between the at least one edge of the windshield and an interior face of the channel when the windshield is inserted therein, and the bonding agent is injected to fill such space.

9. The windshield mounting assembly of claim 1, wherein the windshield mount extrusion is further comprised of at least one mounting projection extending therefrom wherein the mounting projection is configured to couple to a vehicle.

10. The windshield mounting assembly of claim 9, wherein the joiner extrusion has a substantially U-shaped cross section where the parallel ridges are configured to point substantially towards an interior face of the arc of the U-shape.

11. The windshield mounting assembly of claim 1, wherein the joiner extrusion is comprised of a polymer and the windshield is comprised of glass.

12. The windshield mounting assembly of claim 1, wherein the bonding agent is epoxy based.

13. The windshield mounting assembly of claim 1, wherein the bonding agent is an epoxy.

14. A windshield mounting assembly, the assembly comprising, a windshield comprised of at least one edge, one or more joiner extrusions wherein the joiner extrusions are comprised of a length of material with a channel running along a longitudinal axis of the length of material where such longitudinal axis is shaped to accommodate the at least one edge of the windshield and the windshield is inserted therein, wherein there are at least two parallel ridges along an inner face of the channel and running along the longitudinal axis thereof and angled at least partially in the direction that the windshield was inserted into the channel in;

a mounting extrusion comprised of a mounting channel and one or more mounting protrusions wherein the mounting channel is configured to receive the one or more joiner extrusions and the one or more mounting protrusions are configured to couple the mounting extrusion to a vehicle and wherein the mounting extrusion is configured to at least partially enclose around the one or more joiner extrusions such that the one or more joiner extrusions can rotate without leaving the mounting channel; and a bonding agent configured to adhere to both the windshield and the one or more joiner extrusions.

* * * * *